(12) United States Patent
Scruggs et al.

(10) Patent No.: US 6,583,882 B2
(45) Date of Patent: Jun. 24, 2003

(54) APPARATUS AND METHOD USING DIGITALLY CONTROLLED INTEGRATION FOR SIGNAL DETECTION WITH IMPROVED NOISE CHARACTERISTICS

(75) Inventors: Michael K. Scruggs, Pompton Plains, NJ (US); Peter A. Wall, Bayonne, NJ (US); Ming-Hsing Yu, Wayne, NJ (US); Robert A. Kovacs, West Orange, NJ (US)

(73) Assignee: Honeywell International Inc., Morristown, NJ (US)

( * ) Notice: Subject to any disclaimer, the term of this patent is extended or adjusted under 35 U.S.C. 154(b) by 312 days.

(21) Appl. No.: 09/741,560

(22) Filed: Dec. 20, 2000

(65) Prior Publication Data

US 2001/0030752 A1 Oct. 18, 2001

Related U.S. Application Data

(60) Provisional application No. 60/190,664, filed on Mar. 17, 2000.

(51) Int. Cl.[7] ............................................... G01C 19/72
(52) U.S. Cl. ....................................................... 356/460
(58) Field of Search ................................ 356/460, 463, 356/464, 477, FOR 112; 250/227.19, 227.27; 385/12

(56) References Cited

U.S. PATENT DOCUMENTS

| | | | | |
|---|---|---|---|---|
| 4,717,256 A | * | 1/1988 | Ensley et al. | 356/460 |
| 5,262,843 A | | 11/1993 | Sugarbaker et al. | 356/350 |
| 5,430,545 A | | 7/1995 | Kovacs | 356/350 |
| 5,467,190 A | * | 11/1995 | Desmarais et al. | 356/459 |
| 5,926,275 A | | 7/1999 | Sanders et al. | 356/350 |

* cited by examiner

Primary Examiner—Samuel A. Turner

(57) ABSTRACT

A signal conditioning circuit reduces an interferrometric fiber optic gyro (IFOG) noise, the IFOG including a light source, Integrated Optics Chips (IOC) and a coupler to output an optical power signal corresponding to a rotation-induced phase shift in a fiber coil of the IFOG. The signal conditioning circuit includes a photodiode that converts the optical power signal to a corresponding electrical compensation signal and one or more switched integrators that receive and process the electrical compensation signal by selectively switching between a plurality of modes of each one of the one or more switched integrators. A method of signal conditioning in the IFOG to reduce IFOG noise includes the steps of converting the optical power signal to a corresponding electrical compensation signal and selectively integrating a current of the electrical compensation signal using at least one switched integrator.

20 Claims, 4 Drawing Sheets

APPARATUS AND METHOD USING DIGITALLY CONTROLLED INTEGRATION FOR SIGNAL DETECTION WITH IMPROVED NOISE CHARACTERISTICS

CROSS REFERENCE TO RELATED APPLICATION

This application claims the benefit of U.S. Provisional Application No. 60/190,664, filed Mar. 17, 2000, and incorporated by reference herein.

BACKGROUND OF THE INVENTION

1. Field of the Invention

The present invention relates to interferrometric fiber optic gyros (IFOG), and more particularly to lowering the total gyro noise in an IFOG.

2. Description of the Related Art

There is a growing demand for high accuracy gyros for satellite pointing applications. In order to improve gyro sensitivity, it is necessary to lower the total gyro noise. In typical satellite pointing applications, an interferrometric fiber optic gyro (IFOG) is employed. In the IFOG, noise elements arise from both the optical and electrical elements.

A closed loop IFOG is illustrated in FIG. 1. An IFOG generally includes a light source 10, a coupler 20, an integrated optics chip 30, and a fiber coil 40, which comprise the optical circuit 5. The fiber coil 40 provides the rotation-sensitive interferometer. The processing electronics 45 of the IFOG generally comprise a photodetector 50, an amplifier/filter 60, an analog-to-digital converter (A/D) 70, a digital signal processor (DSP) 80, a digital to analog converter (D/A) 90 and amplifier 95.

The processing electronics 45 function to provide a feedback phase shift in the optical circuit 5 which effectively nulls out a rotation-induced phase shift sensed in the fiber coil 40. The magnitude of the feedback phase shift corresponds to the rotation rate. The photodetector 50 converts an optical power output from optical coupler 20 to a corresponding voltage. The corresponding voltage is processed by amplifier/filter 60 and translated to a digital signal by A/D converter 70. The corresponding feedback signal is calculated in DSP 80, and fed back into the gyro with a modulating square wave via D/A converter 90 and amplifier 95.

In a square wave modulated IFOG, a rotation about a rate input axis 41 of the fiber coil 40 produces input signals at the photodetector 50, which are denoted as "A" and "B" in FIG. 1A. A difference A−B corresponds to the sensed input rotation rate and is designated $D_{error}$. The input signal characteristics result from interference patterns of the counter propagating light waves that travel in the fiber optic coil 40. The sharp spikes present in the waveform are a result of the modulated signals driving the interference patterns through the peak of the interference curves.

An accurate measurement of the magnitude of the A and B levels of the photodetected signals is crucial to the overall performance of the IFOG. However, this measurement accuracy of the low level "A" and "B" signals is compromised by the presence of noise and the high level signal generated by the optical spikes. A high gain is required to maintain the required closed loop performance, but results in signal distortion due to saturation effects from the high optical spike signals in the signal processing electronics 45, most notably in the photodetector 50 and amplifier/filter 60.

Prior art signal processing methods utilize very fast D/A converters 90 and amps 95 in modulation schemes to minimize the width of the optical spikes. The photodetector 50 is typically comprised of a photodiode 52 and a wide bandwidth transimpedance amplifier 54 to maintain signal fidelity. The amplifier/filter 60 is typically comprised of several stages of high gain amplification with clipping circuitry and filters to extract the desired A and B signals. The wide bandwidth of the photodetector 50 and amplifier/filter 60 make them susceptible to noise pickup.

Additionally, digital techniques using multiple samples or oversampling are typically employed to average the noise in each A and B sample. The use of oversampling increases system speed requirements and requires the use of high-speed logic and a fast DSP 80. The fast logic and higher clock speeds increase the likelihood of noise coupling into the high gain wide band photodetector 50 and amplifier/filter 60, which ultimately degrades IFOG performance.

Therefore, an improved apparatus and method for signal conditioning to reduce IFOG noise are needed.

SUMMARY OF THE INVENTION

It is therefore an object of the present invention to provide an apparatus for reducing an overall IFOG noise.

It is another object of the present invention to provide an improved method of signal conditioning in an IFOG.

To achieve the above objects, a signal conditioning circuit to reduce an interferrometric fiber optic gyro (IFOG) noise is provided in accordance with the present invention, the IFOG including a light source, IOC and coupler to output an optical power signal corresponding to a rotation-induced phase shift in a fiber coil of the IFOG. The signal conditioning circuit comprises a photodiode that converts the optical power signal to a corresponding electrical compensation signal and at least one digital controlled (switched) integrator that processes the electrical compensation signal. Selectively switching the integrator or integrators between a plurality of modes effectively produces a compensation signal with lower noise characteristics.

A method of signal conditioning in an IFOG to reduce IFOG noise is also provided in accordance with the present invention. The method comprises the steps of converting the optical power signal to a corresponding electrical compensation signal by selectively integrating a current of the electrical compensation signal using at least one switched integrator.

BRIEF DESCRIPTION OF THE DRAWINGS

The above and other objects, features and advantages of the present invention will become more apparent in light of the following detailed description of an exemplary embodiment thereof taken in conjunction with the attached drawings in which.

DETAILED DESCRIPTION

In the description of the illustrative embodiments of our invention, well-known functions or constructions are not described in detail to avoid obscuring the invention in unnecessary detail.

Figure 1:
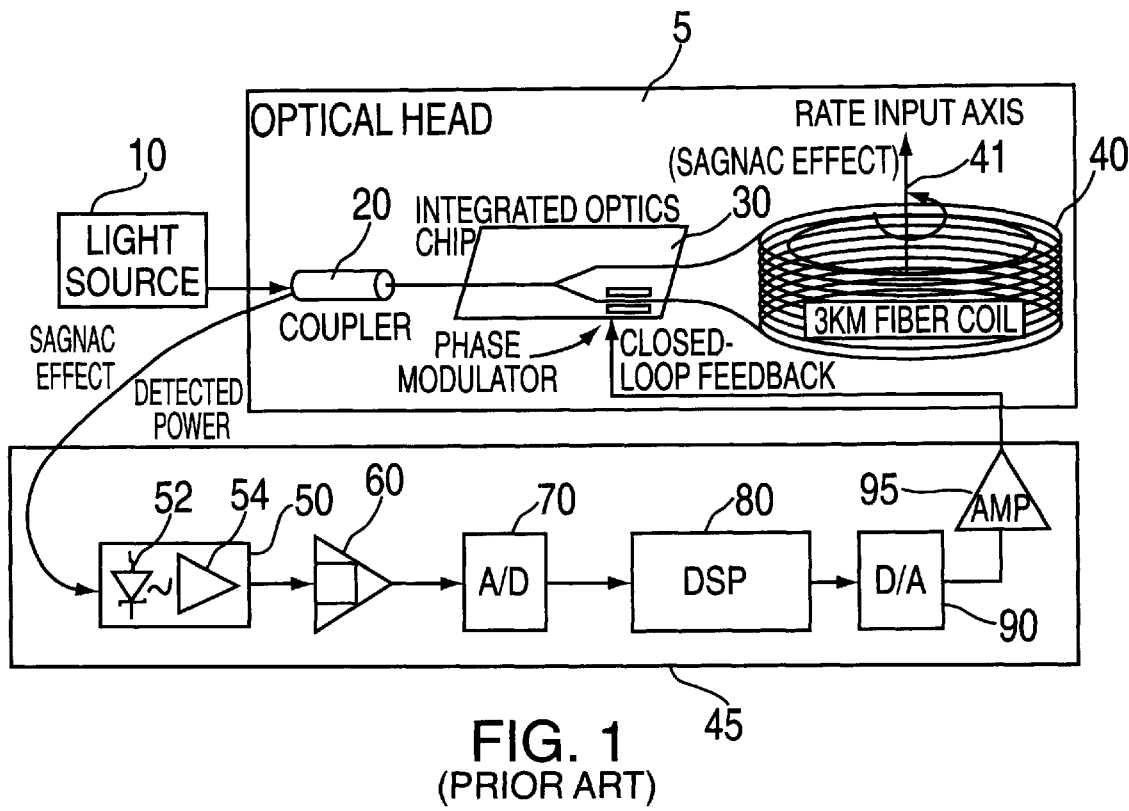
FIG. 1 is a block diagram illustrating a conventional IFOG.
Figure 1A:
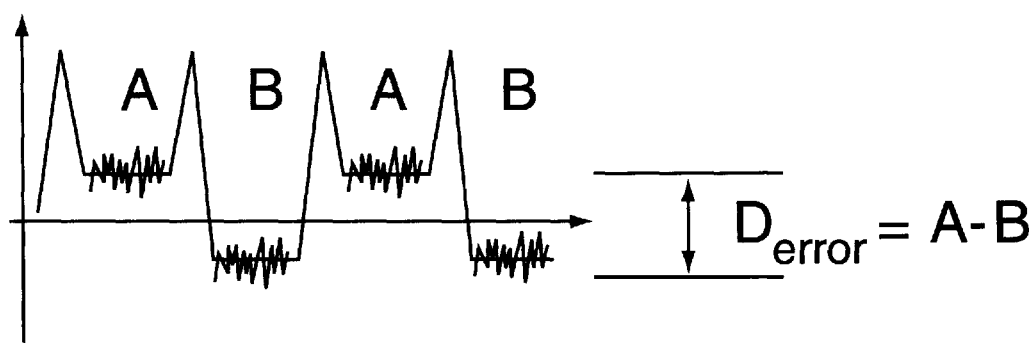
FIG. 1A is a signal diagram illustrating input signals to a photodetector of the conventional IFOG.
Figure 2:
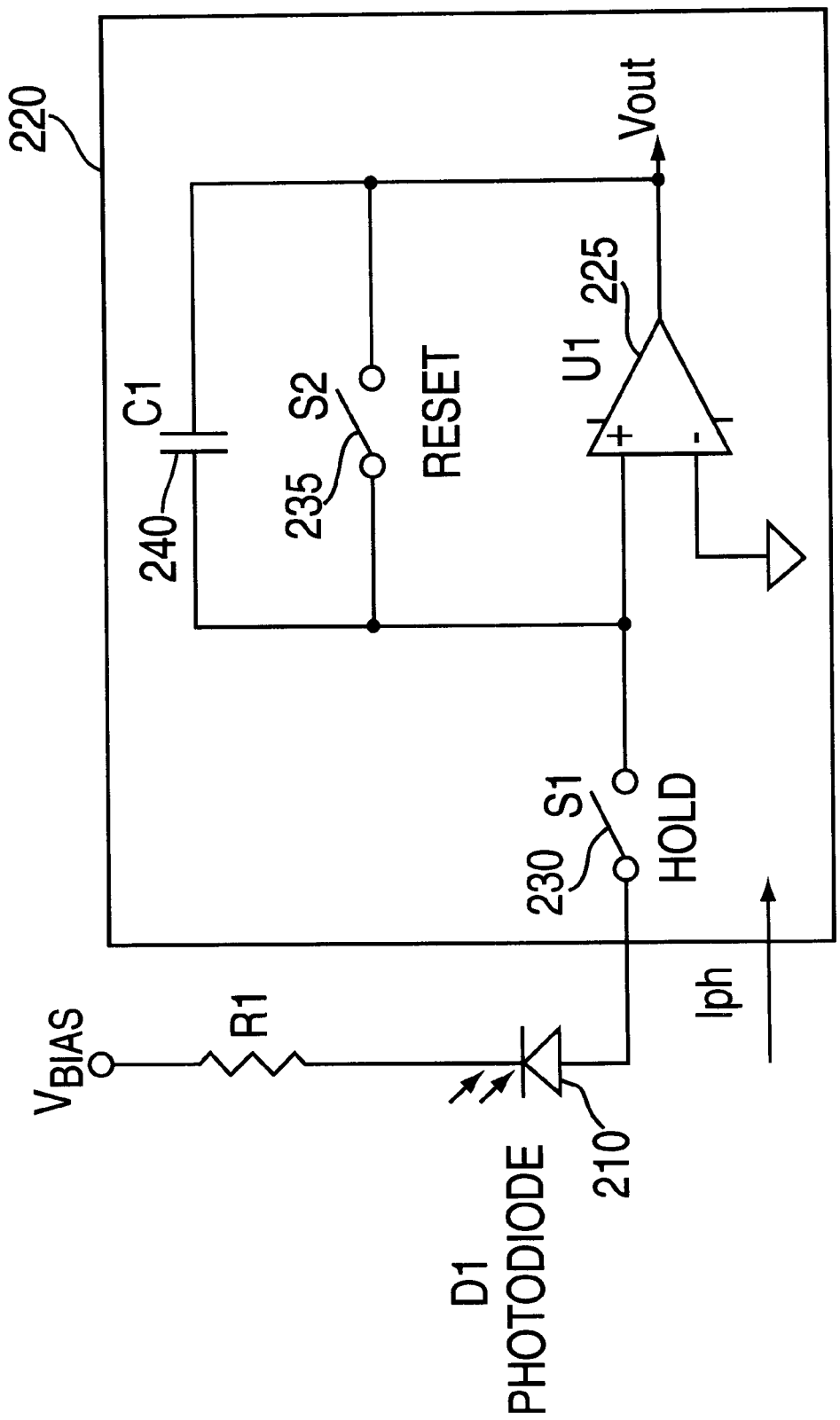
FIG. 2 illustrates an electronic integrator in accordance with an illustrative embodiment of the present invention.

Turning again to the drawings, the present invention improves upon the present signal conditioning techniques and reduces the overall IFOG noise by incorporating a digitally controlled integrator 220 (or "switched integrator") as illustrated in FIG. 2. The switched integrator 220 replaces the high-gain wide-bandwidth transimpedance amplifier 54 in the photodetector 50.

Referring to FIG. 2, the switched integrator 220 may be implemented using readily available electronic integrated circuit components or may be realized with discrete semiconductor devices. Photodiode 210 is operatively biased and connected to the input of switched integrator 220. Operational amplifier 225, together with switches 230 and 235 and capacitor 240, comprise the switched integrator 220. Switches 230 and 235 are preferably implemented with MOS (metal-oxide semiconductor) transistors, to provide fast, low resistance switching. Bipolar transistors may also be used.

In operation, photocurrents generated by the IFOG interference signals are converted to electrical current by photodiode 210. In FIG. 2, the photodiode 210 is biased to operate in a photoconductive mode. However, the photodiode 210 may optionally be biased and configured to operate in a photovoltaic mode. In the photoconductive mode, the photocurrents flow into the switched integrator 220 via switch 230. By controlling switches 230 and 235, the mode of operation of the switched integrator 220 may be controlled.

The switched integrator 220 is operative in an "integrate mode" during the period when switch 230 is closed (conductive) and switch 235 is open (not conductive). In the integrate mode the operational amplifier 225 integrates the photocurrent $I_{ph}$ to produce an output voltage ($V_{out}$) according to Equation 1, wherein C is the value of capacitor 240.

$$V_{out} \equiv \frac{-1}{C} \int I_{ph} \cdot dt \qquad \text{Equation 1}$$

During a period when both switch 230 and 235 are open, the switched integrator 220 is operative in a "hold mode". In the hold mode the voltage potential between the input and output of the operational amplifier 225 is stored across the capacitor 240. The output is therefore not affected by a signal occurring at the input.

Finally, during a period when switch 230 is open and switch 235 is closed, the switched integrator is operative in a "reset mode". In the reset mode, capacitor 240 is shorted, and the output of operational amplifier 225 is clamped to zero.

While the switched integrator 220 may be realized using readily available electronic integrated circuit components, or discrete semiconductor devices, the preferred embodiment utilizes standard monolithic integrated circuits. Monolithic integrated circuits offer improved component matching, stability, accuracy, and packaging economy.

Figure 3:
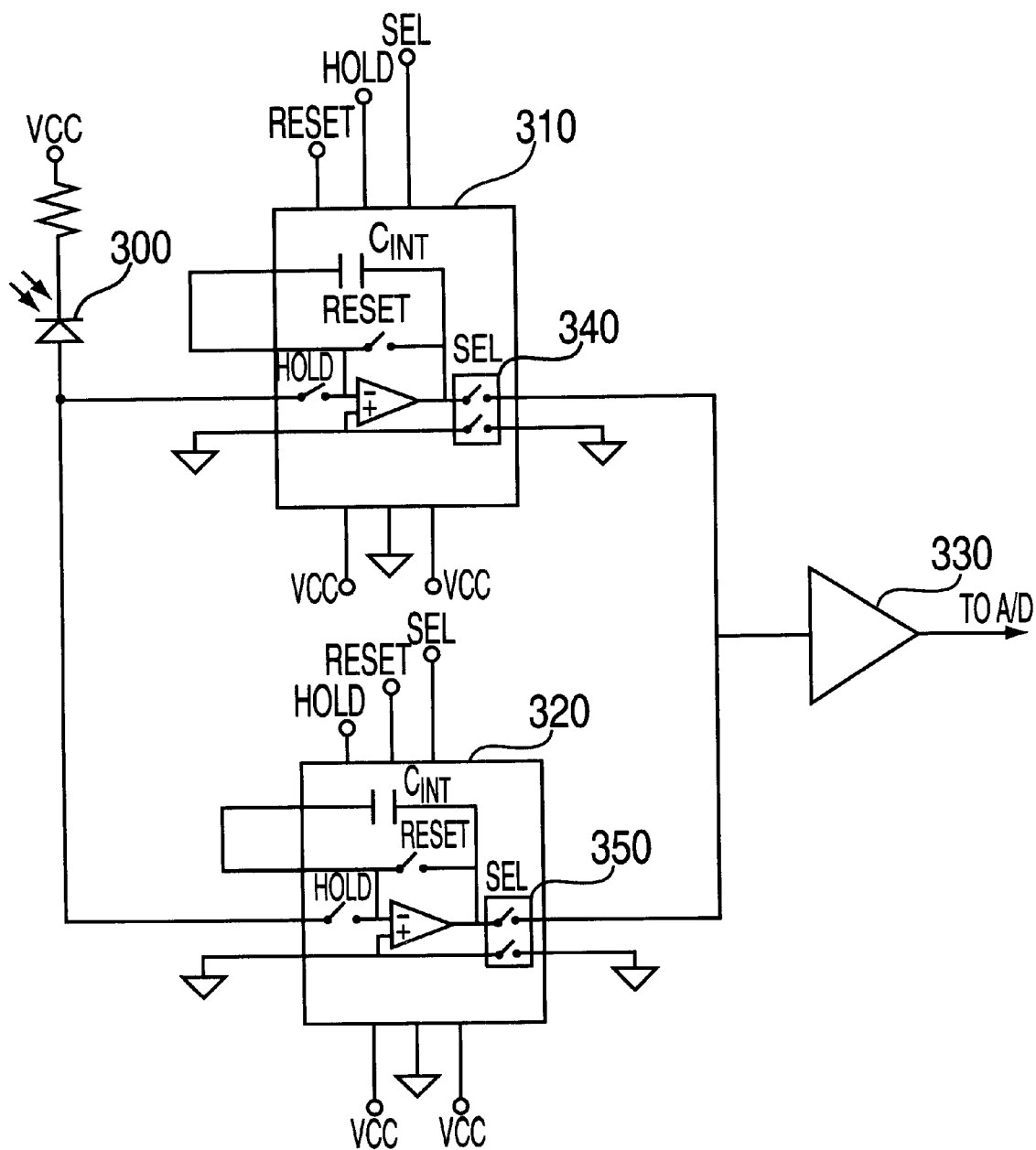
FIG. 3 illustrates a signal conditioning circuit utilizing two electronic integrators in accordance with the present invention.

Referring to FIG. 3, an IFOG signal conditioning circuit in accordance with a second illustrative embodiment of the present invention is depicted. Two switched integrators 310 and 320 are interposed between a photodiode 300 and an amplifier 330. Each of these switched integrators corresponds to the integrator 220 of the embodiment of FIG. 2 of our invention. The reset, hold and integrate modes of each switched integrator 310, 320 are preferably controlled digitally and are synchronized to the IFOG modulation signal. The preferred embodiment utilizes the two switched integrators 310, 320 on a single integrated circuit package, for compactness and precision matching of components. While the signal conditioning circuit may alternatively be implemented using a single switched integrator 220, the speed requirements are much more stringent, making it less practical.

In FIG. 3, the photodiode 300, corresponding to the photodiode 210 of the embodiment of FIG. 2 is operatively biased and connected to the input of both switched integrators 310 and 320. The outputs of the switched integrators 310 and 320 drive the amplifier 330 through select switches 340 and 350, respectively. Digital control precisely synchronizes the integration time with the gyro modulation signal, and accurately controls the integration timing. The digital control may be implemented using common logic techniques known in the art and may be fabricated using gate-array technology. For example, the timing and control may be realized using a DSP with a software program. The preferred embodiment uses the DSP with the interface logic being realized in a programmable gate-array. This approach provides the greatest flexibility for modifications while requiring minimal hardware changes.

Figure 4:
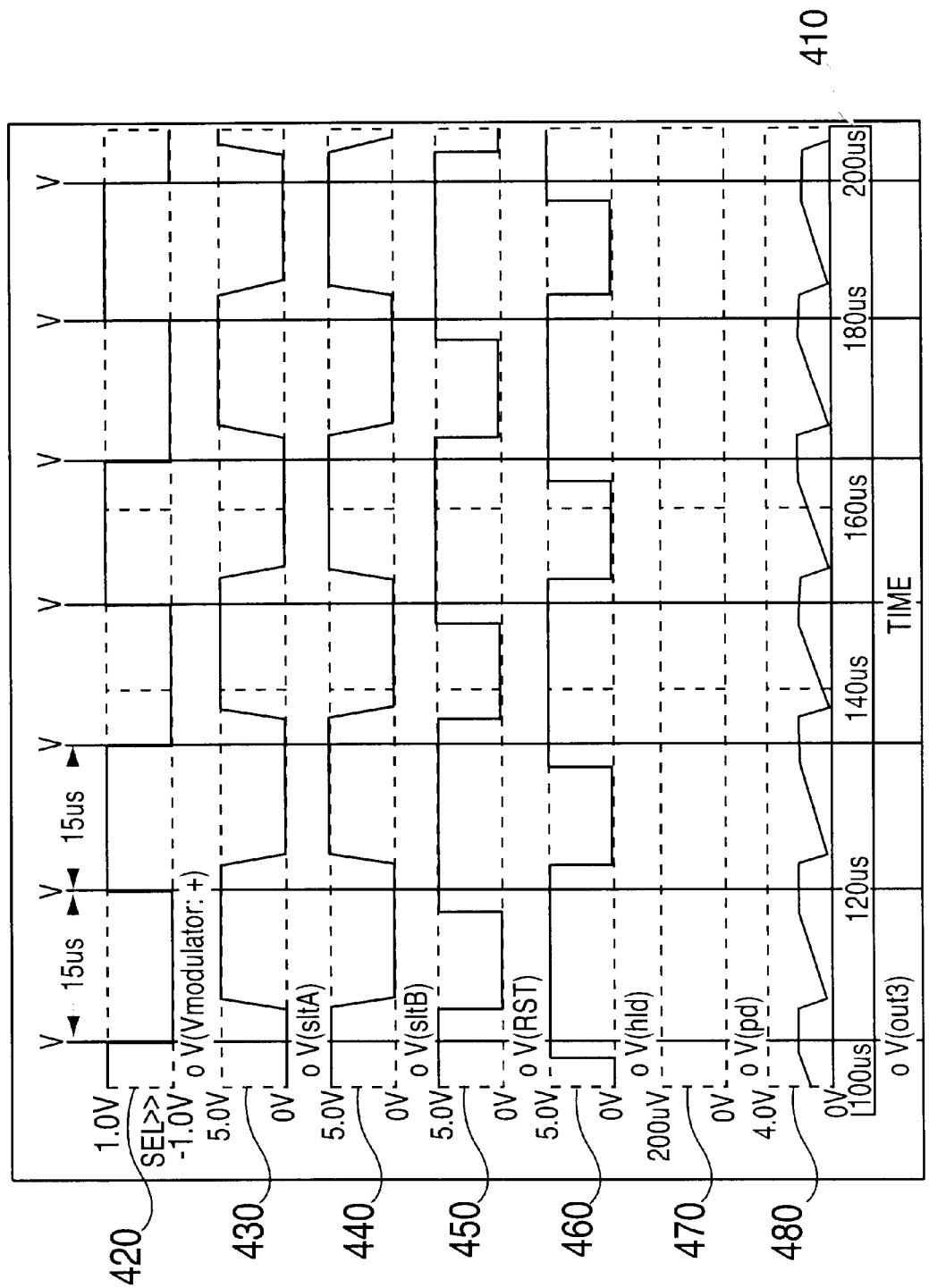
FIG. 4 illustrates a signal diagram of the IFOG in accordance with another illustrative embodiment of the present invention.

Referring to FIG. 4, a timing diagram illustrating the electrical signals required to operate the IFOG and integrators 310 and 320 is shown. In FIG. 4 a plurality of signals 420–480 are plotted on a time scale 410. The time scale 410 varies with the natural transit time of the IFOG in the given application. That is, the time scale 410 is a function of the gyro fiber coil 40 characteristics and dimensions in the served IFOG. The transit time is defined as the time duration required for light to travel from the integrated optics chip (IOC) 30 through the fiber coil 40 and back to the IOC 30.

In FIG. 4, a timing diagram for a 3 Km IFOG having a natural frequency of approximately 33.3 KHz is shown. A gyro modulation signal 420 is a square wave having a period of 30 micro seconds. Signals 430 and 440 drive select switches 340 and 350, respectively. Each switch closes during a low state (OV) of the corresponding signal. Signal 450 is a reset signal and signal 460 is an integrate signal. These signals are cross-wired to each integrator 310, 320 assuring that when one integrator is in a reset mode the other is in an integrate mode. That is, with reference to FIG. 2, switches 230 and 235 are under the control of signals 450 and 460 in a cross-wired configuration to control the modes of each integrator such that, when one integrator 310 or 320 is in a reset mode, the other is in an integrate mode. Signal 470 is representative of a typical IFOG signal in a zero input rate condition, showing the detected power of the photodiode with each optical spike.

Signal 480 represents the output of the IFOG signal conditioning circuit of FIG. 3. Upon analyzing the output signal 480, several advantages of using the IFOG signal conditioning circuit of the present invention may be observed:

1. The frequency spectrum of photodetected power has a very wide bandwidth (signal 470), measured in the range of 500–1000 MHz.
2. The frequency response of output signal 480 is significantly lowered to approximately 33 KHz.
3. The output signal 480 is stable during the time period when the optical spikes in signal 470 are present, and therefore the output signal 480 may be processed during this period since the noise and distortion have been eliminated during this period.

4. Oversampling techniques are not required for noise averaging since data samples are automatically averaged by the integrator. Consequently, the system may be operated at a lower clock frequency and digital noise is reduced in the system.

Accordingly, the IFOG signal conditioning circuit of the present invention reduces the overall system noise while overcoming the disadvantages of the prior art. The system speed requirements are lowered, since no oversampling is required, thereby reducing the likelihood of noise coupling that ultimately degrades IFOG performance.

While the present invention has been described in detail with reference to the preferred embodiments, they represent mere exemplary applications. For example, while the preferred embodiment utilizes two switched integrators, the technique of the present invention can easily be extended to a circuit containing three or more switched integrators with additional logic and corresponding adjustments to the circuit timing. This extended circuit would be especially suitable for applications involving smaller, low cost IFOGS that are used in navigation systems. Thus, it is to be clearly understood that many variations can be made by anyone having ordinary skill in the art while staying within the scope and spirit of the present invention as defined by the appended claims.

What is claimed is:

1. A signal conditioning circuit to reduce an interferometric fiber optic gyro (IFOG) noise, said IFOG including a light source, Integrated Optics Chip (IOC) and coupler to output an optical power signal corresponding to a rotation-induced phase shift in a fiber coil of the IFOG, said signal conditioning circuit comprising:

a photodiode that converts said optical power signal to a corresponding electrical compensation signal; and at least one switched integrator operative to receive and process the electrical compensation signal to remove noise therefrom by selectively switching between a plurality of modes of each one of the at least one switched integrator.

2. The signal conditioning circuit of claim 1, wherein the at least one switched integrator comprises a first and second switched integrator, each of which are selectively activated in an alternating fashion to process the electrical compensation signal.

3. The signal conditioning circuit of claim 1, wherein each one of the at least one switched integrator comprises:

an operational amplifier having an input and an output;

a first switch interposed between the photodiode and the input of the operational amplifier;

a second switch operatively connected between the input and output of the operational amplifier; and a capacitor operatively connected between the input and output of the operational amplifier.

4. The signal conditioning circuit of claim 3, wherein one of the plurality of modes of each of the at least one switched integrator is an integrate mode, during which the first switch is conductive and the second switch is not conductive, said integrate mode producing an output voltage ($V_{out}$) for a corresponding input current ($I_{ph}$) and capacitor value (C) in accordance with the following equation:

$$V_{out} \equiv \frac{-1}{C} \int I_{ph} \cdot dt.$$

5. The signal conditioning circuit of claim 4, wherein one of the plurality of modes of each of the at least one switched integrator is a reset mode, during which the first switch is not conductive and the second switch is conductive, said reset mode producing a zero output voltage.

6. The signal conditioning circuit of claim 5, wherein each one of the at least one switched integrators are selectively switched between the integrate mode and the reset mode.

7. The signal conditioning circuit of claim 6, wherein the at least one switched integrator is comprised of first and second switched integrators, the first switched integrator being switched to the integrate mode while the second switched integrator is switched to the reset mode, and the first switched integrator being switched to the reset mode while the second switched integrator is switched to the integrate mode.

8. The signal conditioning circuit of claim 7, wherein only the one of the first and second switched integrators currently in the integrate mode is selectively activated to process the electrical compensation signal.

9. The signal conditioning circuit of claim 8, wherein switching between modes and selective activation of the switched integrators are both digitally controlled.

10. A method of signal conditioning in an IFOG to reduce IFOG noise, said IFOG including a light source, IOC and coupler to output an optical power signal corresponding to a rotation-induced phase shift in a fiber coil of the IFOG, said method comprising the steps of:

converting said optical power signal to a corresponding electrical compensation signal; and selectively integrating an electrical current of the electrical compensation signal using at least one switched integrator.

11. The method of claim 10, wherein the step of selectively integrating an electrical current of the electrical compensation signal comprises the steps of:

selectively alternating a current switched integrator activation between a first and second switched integrator; and integrating the electrical current of the electrical compensation signal using the currently activated switched integrator.

12. The method of claim 11, wherein the step of selectively alternating a current switched integrator activation comprises the additional steps of:

switching the currently activated switched integrator into an integrate mode; and switching an inactive switched integrator into a reset mode.

13. A low noise signal detection apparatus for an IFOG, said IFOG including a light source, a coupler, an integrated optics chip and a fiber coil, said signal detection apparatus comprising:

a signal conditioning circuit including a photodiode and at least one switched integrator that receives an optical power signal corresponding to a rotation-induced phase shift of the fiber coil and outputs a corresponding low noise electrical compensation signal;

an amplifier that amplifies the electrical compensation signal;

an analog-to-digital converter that converts the electrical compensation signal to a corresponding digital compensation signal;

a digital signal processor that calculates a corresponding digital feedback signal based on the electrical compensation signal;

a digital-to-analog converter to convert the corresponding digital feedback signal to a corresponding analog feedback signal; and an amplifier that amplifies the corresponding analog feedback signal;

wherein said amplified corresponding analog feedback signal is forwarded to the integrated optics chip to compensate the rotation-induced phase shift.

14. The low noise signal detection apparatus of claim 13, wherein the at least one switched integrator comprises a first and second switched integrator, each of which are selectively activated in an alternating fashion to process the electrical compensation signal.

15. The low noise signal detection apparatus of claim 13, wherein each one of the at least one switched integrator comprises:

an operational amplifier having an input and an output;

a first switch interposed between the photodiode and the input of the operational amplifier;

a second switch operatively connected between the input and output of the operational amplifier; and a capacitor operatively connected between the input and output of the operational amplifier.

16. The low noise signal detection apparatus of claim 15, wherein each of the at least one switched integrator is selectively switched into an integrate mode, during which the first switch is conductive and the second switch is not conductive, said integrate mode producing an output voltage ($V_{out}$) for a corresponding input current ($I_{ph}$) and capacitor value (C) in accordance with the following equation:

$$V_{out} \equiv \frac{-1}{C} \int I_{ph} \cdot dt.$$

17. The low noise signal detection apparatus of claim 16, wherein each of the at least one switched integrator is selectively switched into a reset mode, during which the first switch is not conductive and the second switch is conductive, said reset mode producing a zero output voltage.

18. The low noise signal detection apparatus of claim 17, wherein each one of the at least one switched integrators are selectively switched between the integrate mode and the reset mode.

19. The low noise signal detection apparatus of claim 18, wherein the at least one switched integrator is comprised of first and second switched integrators, the first switched integrator being switched to the integrate mode while the second switched integrator is switched to the reset mode, and the first switched integrator being switched to the reset mode while the second switched integrator is switched to the integrate mode.

20. The low noise signal detection apparatus of claim 19, wherein only the one of the first and second switched integrators currently in the integrate mode is selectively activated to process the electrical compensation signal.

* * * * *